United States Patent
Paton

(10) Patent No.: US 11,596,847 B2
(45) Date of Patent: Mar. 7, 2023

(54) METHOD OF CONSTRUCTING AN ENERGY ABSORBING AND GOLF BALL RETURNING GOLF NET

(71) Applicant: William Paton, Armadale (AU)

(72) Inventor: William Paton, Armadale (AU)

( * ) Notice: Subject to any disclaimer, the term of this patent is extended or adjusted under 35 U.S.C. 154(b) by 4 days.

(21) Appl. No.: 17/496,840

(22) Filed: Oct. 8, 2021

(65) Prior Publication Data

US 2022/0111277 A1   Apr. 14, 2022

Related U.S. Application Data

(60) Provisional application No. 63/090,201, filed on Oct. 10, 2020.

(51) Int. Cl.
  *A63B 69/36* (2006.01)
  *B23P 15/00* (2006.01)
  *A63B 63/00* (2006.01)

(52) U.S. Cl.
  CPC .......... *A63B 69/3623* (2013.01); *B23P 15/00* (2013.01); *A63B 2063/001* (2013.01)

(58) Field of Classification Search
  CPC ... A63B 63/00; A63B 2063/001; A63B 69/36; A63B 69/3623; B23P 15/00
  See application file for complete search history.

(56) References Cited

U.S. PATENT DOCUMENTS

| | | | | |
|---|---|---|---|---|
| 1,437,591 A | * | 12/1922 | Gray | A63B 63/00 473/197 |
| 4,723,780 A | * | 2/1988 | Vinzetta | A63B 63/00 473/197 |
| 5,193,802 A | * | 3/1993 | Saltus | A63B 63/00 473/197 |
| 5,492,319 A | | 2/1996 | Lee | |
| 5,569,094 A | * | 10/1996 | Macaluso | A63B 63/00 273/400 |
| 5,609,528 A | * | 3/1997 | Kehoe | A63B 71/022 473/157 |
| 6,315,677 B1 | | 11/2001 | Sandelin | |
| 7,021,630 B1 | | 4/2006 | Cho | |
| 8,376,871 B1 | | 2/2013 | Cloud | |
| 9,764,215 B2 | | 9/2017 | Lea | |
| 10,173,117 B2 | | 1/2019 | Cho | |
| 2002/0049092 A1 | * | 4/2002 | Yoon | A63B 69/36 473/197 |
| 2004/0191738 A1 | * | 9/2004 | Grant | A63B 69/3623 434/252 |
| 2009/0029804 A1 | * | 1/2009 | Crawley | A63B 69/0097 473/432 |

* cited by examiner

*Primary Examiner* — Matthew P Travers
(74) *Attorney, Agent, or Firm* — Donald Debelak

(57) ABSTRACT

A method of constructing a tight mesh golf net with a support frame that returns a ball to a user, comprising routing the net around the support frame from a forward section that returns the golf ball to the user, under and around a rod between side supports, toward the forward section and upward toward top ends of the side supports.

5 Claims, 6 Drawing Sheets

METHOD OF CONSTRUCTING AN ENERGY ABSORBING AND GOLF BALL RETURNING GOLF NET

FIELD OF INVENTION

The present invention relates to a method and apparatus for receiving (catching) and returning a golf ball. More specifically, the present invention relates to an improved device for receiving and returning golf ball to the user.

BACKGROUND

Golf is a popular sport and in many cases it takes a long time to practice successfully. Thus, golfers often spend a lot of time practicing to improve and improve their golf skills in order to excel in this sport.

In general, golfers typically practice by hitting a golf ball at an outdoor driving range so that they can repeatedly polish their skills by hitting the golf ball. A golf driving range provides an important means for practice, but in many cases golfers must drive for 10-30 minutes to the driving range, and it takes the same time to return home. Traveling to the practice range can be time consuming. In many cases, an extra 30 minutes to 1 hour is spent traveling.

Golfers desire a solution so that golfers can practice in a smaller space (often at the golfer's home or backyard) to eliminate the need to visit an outdoor driving range and provide more practice time for the golfer This net has been invented to solve that issue. However, despite the great advantages offered when compared to golf driving ranges, golf nets on the market currently still have some drawbacks that prevent them from becoming popular practice methods for so-called average golfers.

U.S. Pat. No. 4,556,219, Tillery, is more less a box with one end open, with the open end having extensions for the golfer to hit. The golfer needs to retrieve the ball, and the net is quite large and bulky, U.S. Pat. No. 5,492,319, Lee, is also a box with one end open, but it has a sloping floor to return the ball to the user.

U.S. Pat. No. 6,315,677, Sandin is a golf ball catching funnel, catching balls that go into a net, that drops balls down a hole in the funnel net into a bucket.

U.S. Pat. No. 7,021,630, Cho, presents a net with a back frame for support and a target on the net. This device net is not taunt and the ball drop straight into the net.

U.S. Pat. No. 7,318,777, Sells, offers a product that concentrates on a net that returns a ball to a green area where it goes through a hole and is returned to the user.

U.S. Pat. No. 10,173,117, Cho, abstract reads
"A ball-returning net comprises a vertical wire frame, a vertical net, a floor wire frame, a slope net, two side barrier nets, and a detachable strap. The vertical net is fixed to the edge portion of the vertical wire frame and blocking the opening of the vertical wire frame. The slope net is disposed over the floor wire frame so as to be tilted from an elevated lower portion. of the vertical net to a front edge portion of the floor wire frame, so as to be configured that a ball hitting the vertical net falls down on the slope net and rolls down in a direction of the front edge portion of the floor wire frame. The detachable strap holds the slope net and the vertical wire frame tightly, bending a rear portion of the slope net in a V shape."

This patent seem similar at first to the current application, it is a net with a slope that returns the ball to the user. This net has a front piece that is sloped to return the ball.

The drawback to this patent is that the slope of the net can also cause a. golf ball hit into it to go into the air. The other drawback is the sloping front part of the net doesn't cover the entire net.

The difference this application has over Cho is the method of construction. All of the patents listed above have a frame with a net attached to edges of the frame. The tautness of the frame depends on the tightness of the net When it is attached to the frame.

The method of this patent delivers a net that is more taunt and that will not allow bails to go and sit in the net. This is covered in the SUMMARY OF THE INVENTION SECTION, but the path the net covers over several support rods, adds tension and tightness to the net. The net is not simply attached to the net as is the case for all of the prior art. The other feature of construction that the device of this application is that the upward portion of the net going to the top of the side supports has wings which attach to the side support rods, a feature no other patent has.

A drawback with typical many golf nets is that golf nets often require golfers to step into the net to retrieve the balls, which may have been caught in the debt. Golf nets can be very fragile and require frequent replacement, especially when users need to step in, or reach in with a golf club to retrieve a ball. This short life and awkward use often keeps golfers away from purchasing a golf net. The method of this application produces a net that does not require any interaction with the net once a golf shot has been hit.

OBJECTIVES

One aspect of the present invention is a golf ball receiving device that returns the golf ball to the golfer, eliminating the need to retrieve the ball from the net, to achieve this result, an upright energy absorbing net configuration and a support frame, wherein the energy absorbing net is formed into the golf ball receiving and return device. The frame allows the fine net mesh net, to wrap around three structural support rods to create its energy absorbing characteristic, and to allow the golf ball to travel down the net to the floor portion of the net where it moves towards the golfer. The support frame of the golf ball catching device provides structural integrity to, and create the taut mesh net that stretches out to adequately catch and return the golf ball. The support frame of the golf ball catching device provides structural integrity to and create the taut mesh net that stretches out to adequately catch and return the golf ball.

These features, aspects and advantages of the present invention, as well as other features, aspects and advantages will be better understood with reference to the following drawings, specification and claims.

SUMMARY OF THE INVENTION

A method of constructing a taut mesh golf net with a support frame that returns the ball to a golfer who is hitting balls into it. The taut golf net is created with the net configuration around the support frame returns the golf ball via return net portion to the golfer, and with optional wings that are created by stretching the a section of the back of the net to the side supports with attachable fabric connectors. The net material starts with a floor or ground portion of the net, which is the section that returns the ball to the golfer, and then flows under a structural curved rod, attached to the back part of the side supports it, and then the net material comes back over the top of the first structural curved rod attached to the back part of the side supports, back to the front leg of side supports, where the net edge is connected to the front leg of the side support with looped fabric that is interwoven with the net's edging material, with the looped fabric piece held in place by the front leg as the front leg has a top with a diameter larger than the front leg's diameter and a flexible cylinder below the top, positioned to leave enough room for the looped fabric to lie on the post between the top and the flexible cylinder. From the front leg, the rises to the top to the side supports and is attached to the side supports through looped fabric interwoven into the net's edging material, with the looped fabric piece held in place by the front leg as the front leg has a top with a diameter larger than the front leg's diameter and a flexible cylinder below the top, positioned to leave enough room for the looped fabric to lie on the post between the top and the flexible cylinder, the same mechanism that is used with the front leg The top of the net stretches from the top of one support rod to the top of the other support rod at what point the net terminates. The net that rises to the top of the device, is shorter than the side support, which forces the side supports to curve. To add tautness an optional feature can be added, placing fabric connectors on the net, positioned in the outer 25% of the both sides of the net, so that the fabric connector can be pulled toward the side support poles and fastened to the side support poles. The net also depends on the two return rods that support the return feature of the net which lies in front of the part of the net that the golfer hits into. One return rod connects to each of the side support rods, and are run through a sleeve in the edge of the net that goes toward the golfer. The net edge between the two returns may optionally be an edge with a metal component.

The net configuration creates a taut net, allowing balls to return from the upright net portion down the floor or ground portion of the net that extends forward of the upright net portion to the golfer. The top edge of upright portion of the net is the ending point of the net, and is attached to the tops of the two side supports, the other end of the net, the floor portion starts the net a distance equal to the distance of the return rods in the front of the net.

PART NUMBER DESCRIPTION

Figure 1:
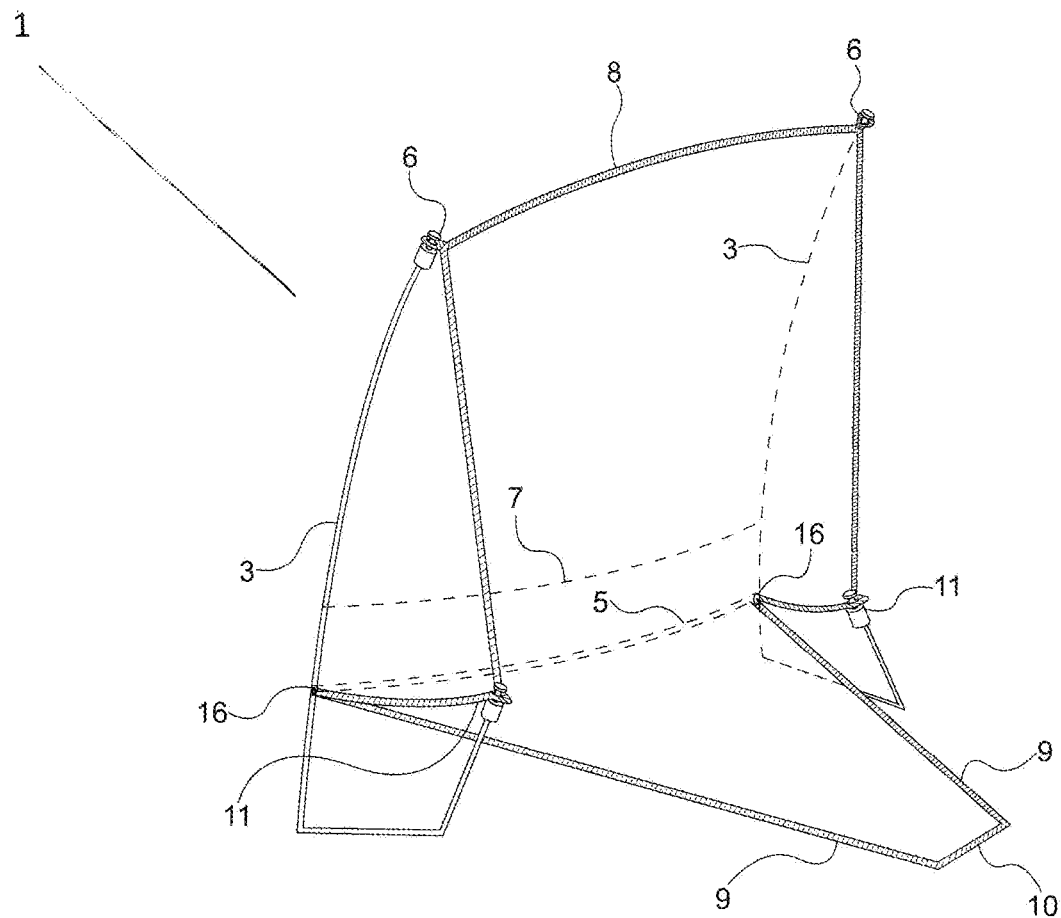
FIG. 1 shows the net without the mesh for a better view of the net frame.

1. The energy absorbing golf ball returning net
2. Net material
3. Rear support bar
4. Front leg of support bar
5. Bar extending between the two support bars
6. Apparatus that allows looped material from net to attach net to top of rear support bars.
7. Optional banner that can go behind the net.
8. Top edge of net that extends between the two rear support bars
9. Return bars that fit into a sleeve of the netting edge on ball return netting
10. Support bar on the front edge of the ball return portion of the net.
11. Apparatus that holds net where it turns from going forward to going upward at the top of the front leg.
12. Top with larger diameter than the post to hold the loop
13. Fabric loop attached intertwined with the net edge to loop around post below the top (12)
14. Cylinder that is attaches to the post leaving a gap between the top and the cylinder to hold the fabric loop.
15. Net edge material
16. Junction method for the rear support bar, the bar that travels between the two support bars, and the bars that integrate with the return support bars.
17. Hole or slot in the support bar for connection the return support bars, a similar hole is used to attach the bar the extends between the two side supports to the side supports.
18. Fabric attachment device that is attached to the net in the outer 25% of the edge and then attached to the side support.
19. Connecting ends to the bar connecting the two side supports 5, and on the return rods 9 to fasten the bar and rods to the side supports 3.

DETAILED DESCRIPTION

FIG. 1 shows the energy absorbing golf ball returning net 1 without the net material 2, but with the net edging material 15. The side supports 3, the front legs of the side support 4 and rear bar connecting the two side supports 5 are the keys for the upright structure of the golf ball retrying net. The net starts at the support bar 10 at the front of the ball return section of the net, the net then flows away from the user, with two return rods that are in sleeves in the net edge 9 holding the net in place, and the net then goes to the underneath side of rod extending between the two support bars 5. Next the net goes over the top of the bar that connects the two side supports 3 and goes toward the user until it is connected to the front legs 4 of the side supports 3 with a connecting apparatus 11, which is detailed in FIG. 4, and is taken to the top of the side supports 3 and attached to the top of the side supports 6, which is detailed in FIG. 4. The connection apparatus 11 of the side supports 3, the bar connecting the two side supports 5, and the two returning rods 9 are detailed in FIG. 3.

Figure 2:
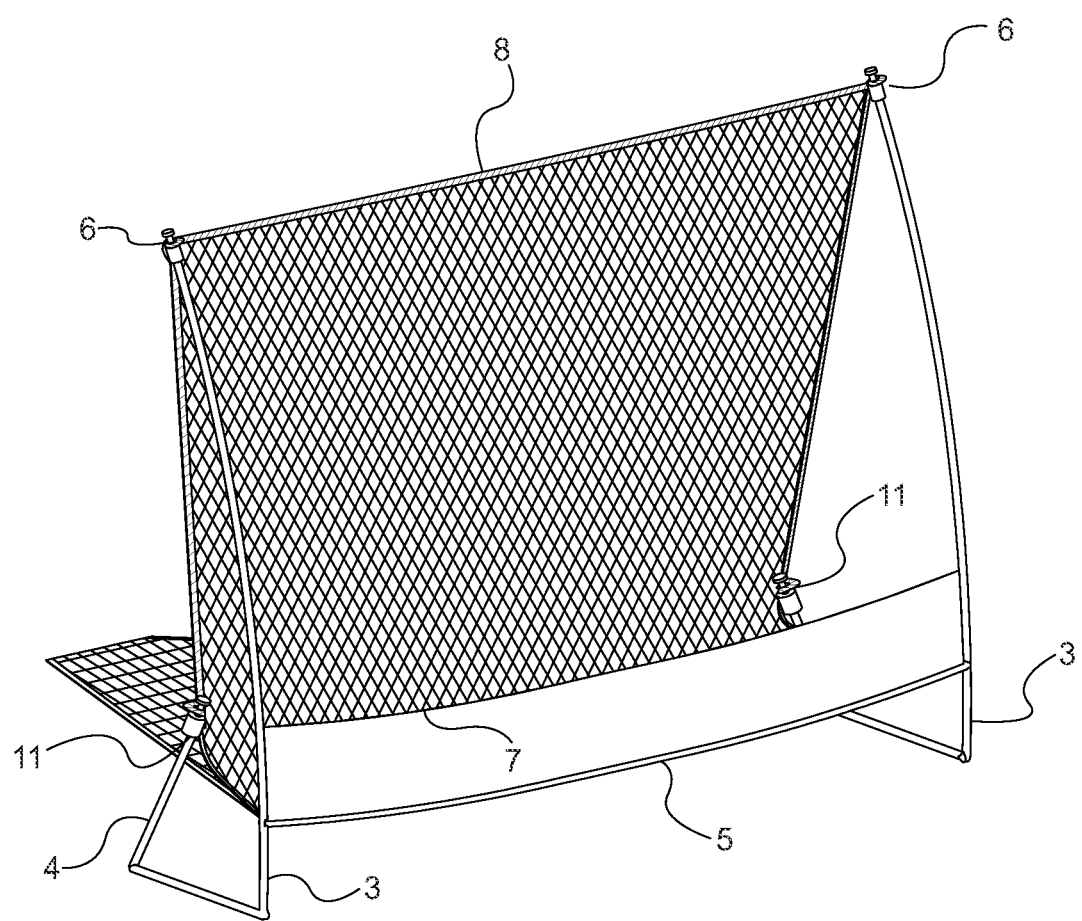
FIG. 2 shows a back view of the golf net.

FIG. 2 Shows the net from the rear, and includes the net material 2 and the optional banner that extends between the side supports 3 and is above the bar connecting the two side supports 3. The figure also shows the connecting point 6 where the top of the net 8 connects to the side supports and the connecting point 11 where the net connects to the front legs 4.

Figure 3:
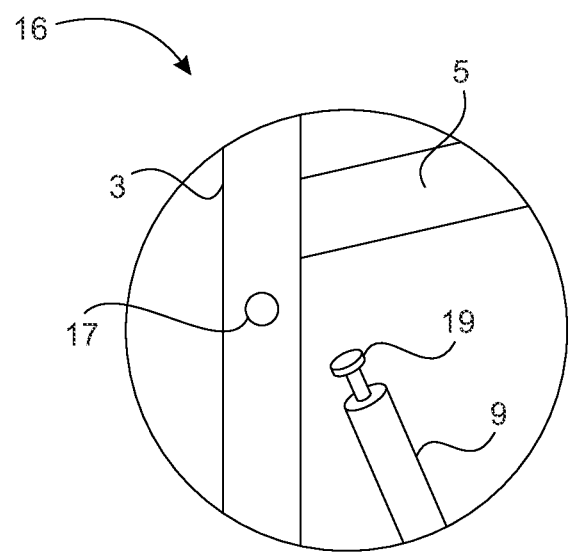
FIG. 3 shows the connections of the return rods and the bar that extends between the two side supports.

FIG. 3 shows the junction method for the side supports 3, the bar connecting the two side supports 5, and the return bars 9, the side supports 3 having holes or slots 17 to connects with connecting tops 19 of the bar that connects between the two side supports 5 and the return rods 9.

Figure 4:
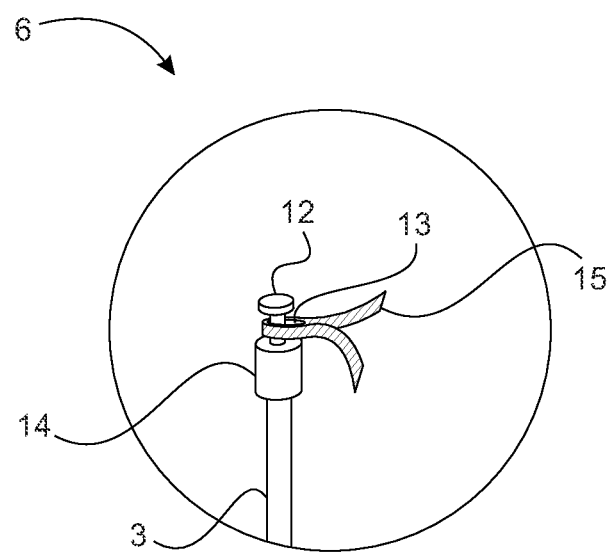
FIG. 4 shows the connection between the fabric loops and the side supports, but it also an identical arrangement of looped fabric connectors and the front legs of the side supports.

FIG. 4 details the connecting apparatus used at the top of the side supports 3 and the fabric loop 13. The top of the side supports 4, as well as the top of the front legs 4 have a top 12 that has a larger diameter than the side support 3 or front leg 4. A cylinder 14 is placed below the top 12 positioned to leave room for the fabric loop 13 to fit between the top 12 and the cylinder 14.

Figure 5:
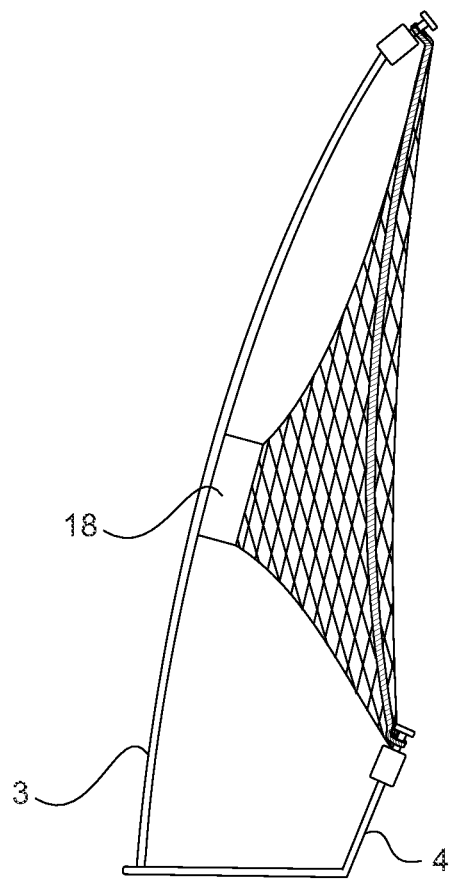
FIG. 5 shows how a fabric attachment device can be included, attaching to the net within 25% of the edge of the net, 25% equates to of total net distance from one side support to the other side support.

FIG. 5 shows how the wings are created, by using a fabric fastener 18 that is attached on the outer section of the net, within 25% of the outer edge, 25% of the entire net width between the two side supports, and then attached one of the side supports 3, the process is then repeated on the other side of the net, with the other side support.

Figure 6:
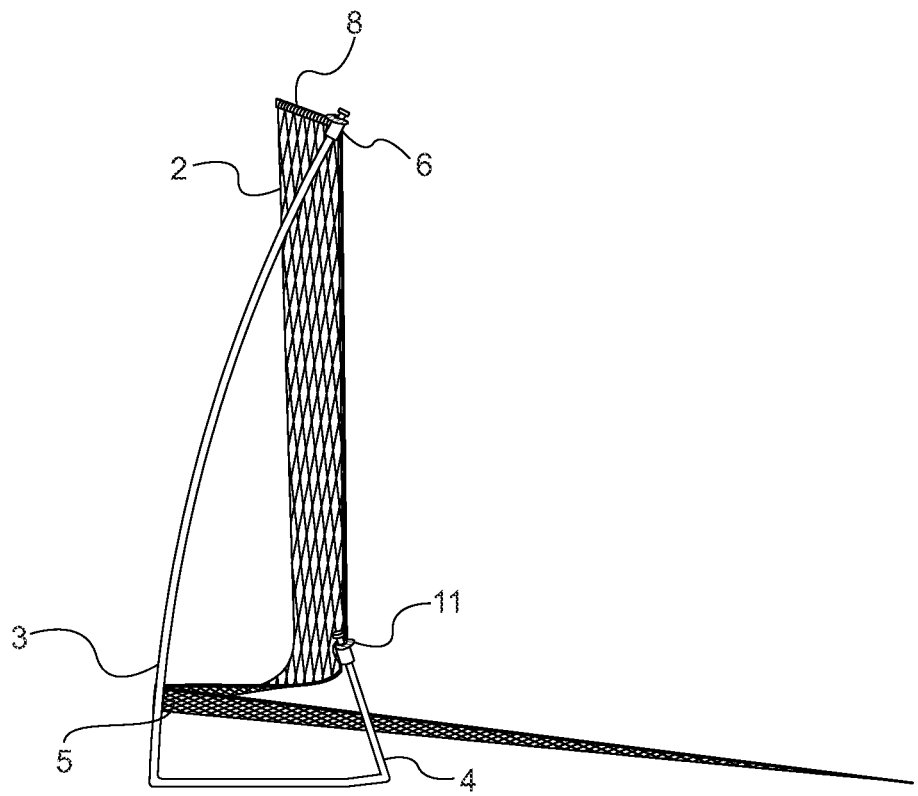
FIG. 6 shows a side view of the golf net, showing how the net after starting at the user, wraps under and then over the bar extending between the two side supports before going up to where the net ends, the top of the net attached to the top of the side supports with the use of fabric loops.

FIG. 6 shows the net from a side view, showing just one side support 3. It demonstrates how the net comes from right before the user's position, goes underneath the bar connecting the two side supports 5, than comes over the bar connecting the two side supports, goes to the apparatus that attaches the net with a fabric loop and then rises to the top of the side support 3 where it is attached with the apparatus at the top of the side support 6 allowing the top to stretch taut between the two side supports 3.

The invention claimed is:

1. A method of constructing a mesh golf net that returns balls hit into the net to a user, the method comprising;
    creating a forward section of the net, for returning the balls, forward of an upright portion of the net, the forward section of net being a starting point for the net's installation;
    utilizing return rods inserted into a sleeve of the net, where the return rods are attached to side supports and then run through the sleeve ending at the forward section of the net;
    incorporating the side supports to hold the net upright, the side supports rising to a top of the upright portion of the net and being substantially 10% longer than a height of the net;
    wherein the side supports have front legs, which rise less than 25% of a total height of the side supports;
    utilizing a rod that connects lower back portions of the side supports;
    incorporating a connecting apparatus on a top end of each side support and on a top of each of the front legs to hold a top of the net;
    routing the net from the forward section of the net, under the rod that connects the side supports, then wrapping the net back over the rod that connects the side supports, then pulling the net toward the starting point, then attaching the net to the connecting apparatus on the front legs of the side supports, and then raising the net and attaching the connecting apparatus to the top ends of the side supports;
    whereby the routing of the net from the forward section of the net, with the net held in place with the return rods, under and around the rod that connects the side supports, creates extra tension on the net, and added tension is created by the side supports being flexed outward in order to attach the top of the net, which is shorter than the side supports.

2. The method of claim 1 where additional net tautness is created by adding fasteners on two sides of the net, a distance away from an edge that is less than 25% of a total net width, the fasteners then being attached to the side supports.

3. The method of claim 1 where a banner is placed above the rod that connects the side supports, with one end of the banner attached to one side support and another end of the banner attached to another side support.

4. The method of claim 1 where the connecting apparatus on the front legs and on the top ends of the side supports are defined by top portions of the front legs and of the side supports that are larger in diameter than respective body diameters of the side supports and front legs, and cylinders are added below the top portions of the side supports and the front legs, leaving a space between the cylinder and the top portions for a fabric loop to be inserted.

5. The method of claim 1 where the connecting apparatus are connected to the net by fabric loops.

* * * * *